United States Patent [19]

Suzuki

[11] Patent Number: 4,539,571

[45] Date of Patent: Sep. 3, 1985

[54] THERMAL PRINTING SYSTEM

[75] Inventor: Kuniaki Suzuki, Tokyo, Japan

[73] Assignee: Tokyo Shibaura Denki Kabushiki Kaisha, Kawasaki, Japan

[21] Appl. No.: 530,674

[22] Filed: Sep. 9, 1983

[30] Foreign Application Priority Data

Sep. 14, 1982 [JP] Japan ................................ 57-158872

[51] Int. Cl.$^3$ ............................................. G01D 15/10

[52] U.S. Cl. ................................ 346/76 PH; 219/216

[58] Field of Search ............ 219/543, 216 PH, 216 R; 346/76 PH, 76 R; 400/120; 250/316.1, 317.1, 318, 319; 338/307, 308, 306

[56] References Cited

U.S. PATENT DOCUMENTS

| | | | |
|---|---|---|---|
| 4,096,510 | 6/1978 | Arai et al. | 219/543 |
| 4,252,991 | 2/1981 | Iwabushi | 219/543 |
| 4,324,486 | 4/1982 | Nishikawa | 219/216 |
| 4,386,360 | 5/1983 | Murayama et al. | 346/76 PH |
| 4,413,170 | 11/1983 | Val et al. | 219/543 |

*Primary Examiner*—E. A. Goldberg
*Assistant Examiner*—Art Evans
*Attorney, Agent, or Firm*—Cushman, Darby & Cushman

[57] ABSTRACT

Disclosed is a thermal printing system in which, an auxiliary heating means is driven to heat a main heating means for dot printing to a print feasible temperature, and at the time of dot printing, the main heating means is heated to the said print feasible temperature. The main heating means and the auxiliary heating means are both disposed on the surface of a radiating substrate. The thermal head apparatus is thus simple in construction and capable of improving printing speed.

9 Claims, 8 Drawing Figures

THERMAL PRINTING SYSTEM

BACKGROUND OF THE INVENTION

The present invention relates to a thermal printing system and a thermal printing head apparatus of the dot print type in which alphanumeric characters, symbols, etc. are printed in the form of combinations of dots.

A conventional thermal printing system with a thermal printing head having a series of heating elements Y1–Y7 arrayed vertically is shown in FIG. 1. For executing thermal printing by means of this printing system, the printing system successively moves the printing head at fixed intervals on a recording paper in the direction orthogonal to the array of the heating elements, that is, in a horizontal direction when the array direction of the heating elements Y1–Y7 is vertical, while at the same time selectively energizing the heating elements Y1–Y7 with a pattern of the symbol to be printed, for example, a character A. Through this movement of the thermal head, the character A denoted as 201 in FIG. 1 is depicted on a matrix (X1–X5)×(Y1–Y7) on the recording paper. Throughout this printing of the character A, the heating element Y4 is energized to allow printing at all the dot locations, X1–X5, in the row. More specifically, this element is alternately placed in a dot formation mode for heating and then in a space mode for cooling. When printing is performed at high speed, the heat generated in the proceeding dot formation mode is insufficiently cooled in a space mode following the dot formation mode. Therefore, in the succeeding dot formation mode, the heating element is overheated due to the remaining heat. This causes the printed dot to be larger in size or thicker in graduation than that of the previous dot formation mode, deformed in its configuration. This leads to inaccurate printing, and characters that are difficult or impossible to read.

To avoid such problems, the conventional thermal printing system changes drive conditions for the thermal printing head depending on whether the dot formation mode is repeated successively or not. Generally, the thermal printing head is heated and cooled with the application of a high level control pulse and a low level control pulse, respectively. When the dot formation mode is not repeated successively, the pulse width is properly selected for setting the heating time. When the dot formation mode is repeated successively, the pulse width of the first control pulse is selected to be wider than the pulse width of the succeeding control pulses. The reason for this follows. As previously mentioned, at the time of high speed printing, before the heat generated in the first dot formation mode is properly dissipated, the next dot formation mode starts. In the second dot formation mode, the temperature of the heating element at the start of the mode is higher than that in the first dot formation mode. To eliminate this temperature difference, the pulse widths of the second and succeeding dot formation modes are set to be narrower than that in the first dot formation mode. By selecting the pulse widths of the control pulses successively applied to the heating element, the heating times in the second and subsequent dot formation modes are shortened, so that the peak heating temperature is equal to that of the first dot formation mode. In this way, the printed dots obtained in the successive dot formation modes are printed uniformly. The change of the drive condition for the heating elements overworks the controller and deteriorates the operating efficiency of the thermal printing system.

Additionally, because of the thermal operation, the thermal printing system is susceptible to a change in ambient temperature. To solve the temperature change problem, a temperature compensating circuit has been incorporated into the thermal printing system.

Use of the temperature compensating circuit, however, makes the system arrangement complicated and increases the cost of the overall system.

SUMMARY OF THE INVENTION

Accordingly, an object of the present invention is to provide a thermal printing system and a thermal printing head apparatus which are easy to operate, simple in construction, error free, and capable of improving printing speed.

According to the invention, there is provided a thermal printing system comprising:

main heating means including a plurality of main heating elements for printing arranged in a line on the surface of a radiating substrate; and auxiliary heating means provided near said main heating means on the surface of said radiating substrate, heated to a temperature below the dot print feasible temperature, wherein, during an operation period, said auxiliary heating element is driven to heat said main heating means at a temperature below the dot print feasible temperature, and at the time of dot printing, said main heating elements selected according to the pattern of the symbol being printed are heated to the print feasible temperature.

According to the invention, there, is further provided a thermal printing head apparatus comprising:

a radiating substrate;

auxiliary heating means provided on said radiating substrate and heated at a temperature below a print feasible temperature when it is operated; and main heating means including a plurality of main heating elements arranged in a line, said main heating means being disposed close to said auxiliary heating means on the surface of said radiating substrate and heated to said print feasible temperature.

DETAILED DESCRIPTION OF THE PREFERRED EMBODIMENTS

Figure 1:
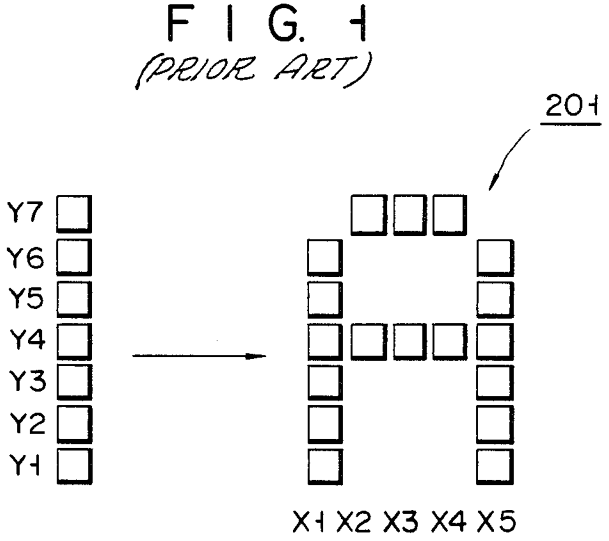
FIG. 1 (PRIOR ART)
FIG. 1 shows a heating section of a conventional thermal printing head.
Figure 2:
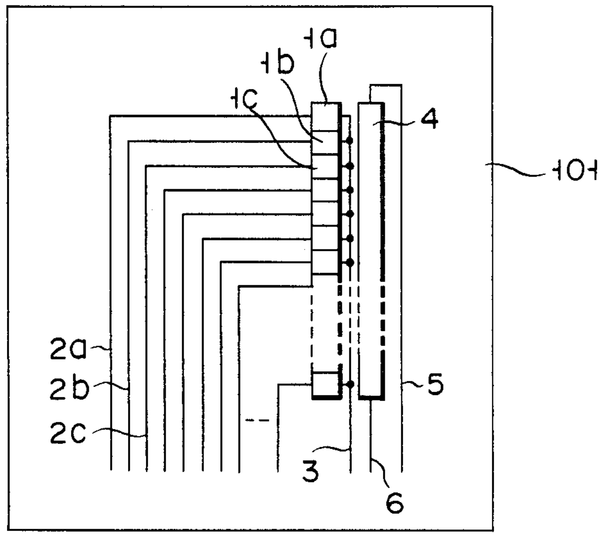
FIG. 2 schematically illustrates an arrangement of a heating section applied to a thermal printing system according to the present invention, the arrangement forming one of the embodiments of the present invention.

As shown in FIG. 2, a series of main heating elements 1*a*, 1*b*, 1*c*, . . . for dot printing are disposed on a radiating substrate 101 of a thermal printing head which is made of ceramic, for example. An auxiliary heating element 4, or a low temperature heating element, is positioned close to and along the main heating elements 1*a*, 1*b*, 1*c*, . . . The main heating elements 1*a*, 1*b*, 1*c*, . . . are coupled at the ends to drive signal input lines 2*a*, 2*b*, 2*c*, . . . for supplying drive signals to drive the main heating elements 1*a*, 1*b*, 1*c*, . . . and at the other ends to a common power line 3. The auxiliary heating element 4 is connected at the ends to power lines 5 and 6 to supply a power source when the thermal printing head is operated.

The thermal printing head will now be described in more detail referring to FIG. 3. The main heating elements 1*a*, 1*b*, 1*c*, . . . are conductive elements with large resistances which generate heat when they are fed with current, as shown in FIG. 2. The low temperature heating element 4 is comprised of conductive elements with large resistances formed close to and along the main heating elements 1*a*, 1*b*, 1*c*, . . . The power line 5 is connected to a power source terminal 9 and the power line 6 is grounded. The main heating elements 1*a*, 1*b*, 1*c*, . . . are connected to the power source terminal 9 and at the other ends to the collectors of NPN transistors 7*a*, 7*b*, 7*c* . . . The emitters of the NPN transistors 7*a*, 7*b*, 7*c* . . . are grounded. The bases of the NPN transistors 7*a*, 7*b*, 7*c* . . . are respectively connected through resistive elements 9*a*, 9*b*, 9*c*, . . . to control pulse terminals 8*a*, 8*b*, 8*c*, . . . which are supplied with control pulses.

With such an arrangement, when the thermal printing head is operated, the power source is supplied to the auxiliary heating element 4 which is then heated to a temperature below a dot print feasible temperature. Under this condition, the radiating substrate 101 is successively moved at fixed intervals in a direction orthogonal to the array direction of the main heating elements 1*a*, 1*b*, 1*c*, . . . , i.e. a horizontal direction when the array direction is taken as a vertical direction. Each interval of movement of the thermal printing head, the heating elements are selected and heated according to the pattern of the symbol being printed. High level control pulses are respectively applied to the drive pulse terminals corresponding to the heating elements selected, so that the corresponding transistors are turned on and apply the power source voltage and thus current is fed to the selected heating elements. In this way, the heating elements are heated. For example, when the heating element 1*a* is selected, a high potential control pulse is applied to the drive pulse terminal 8*a*. This pulse is input through a resistive element 8*a* to the base of the transistor 7*a*, so that the transistor 7*a* is turned on. Then, the power voltage is applied to the same element 1*a* and the current flows through the heating element 1*a* to heat the element. With the heating of the heating element selected, the dot print is effected. By heating the heating elements selected at each interval of movement of the thermal printing head according to the pattern of a symbol being printed, the pattern of the symbol can be printed with a combination of the dots.

In the present embodiment, the auxiliary heating element 4 is always heated to a temperature below the print feasible temperature when the thermal printing head is operated. Therefore, the main heating elements 1*a*, 1*b*, 1*c*, . . . located near auxiliary heating element 4 are always heated at the same temperature. Therefore, heating the main heating elements 1*a*, 1*b*, 1*c*, . . . to the print feasible temperature requires little heat. This indicates that the cooling required of the heating element after the dot formation mode, or the heating mode, decreases correspondingly. Therefore, if the same heating element for print is successively subjected to the dot formation mode, the quality of the dots formed in the dot formation modes following the first dot formation mode are not adversely influenced. As a result, the accuracy of the pattern is improved.

Figure 3:
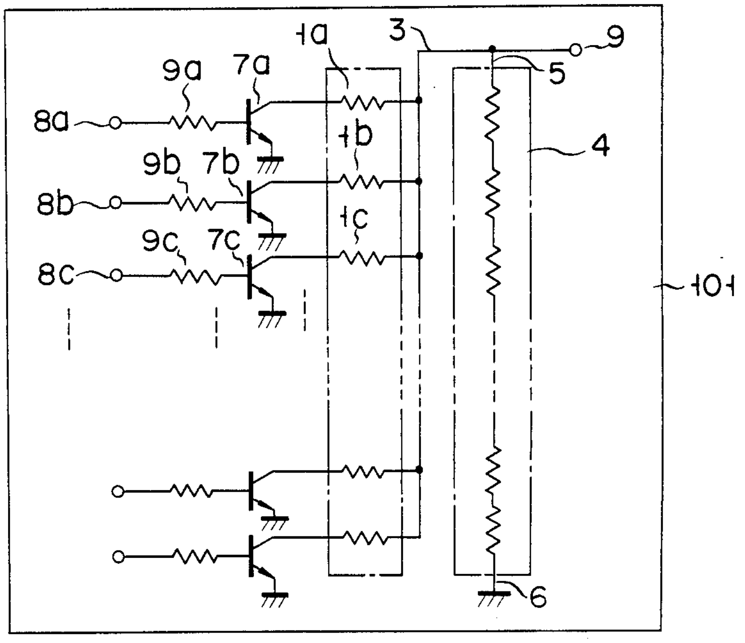
FIG. 3 shows a schematic illustration of the heating section of the printing head shown in FIG. 2.
Figure 4:
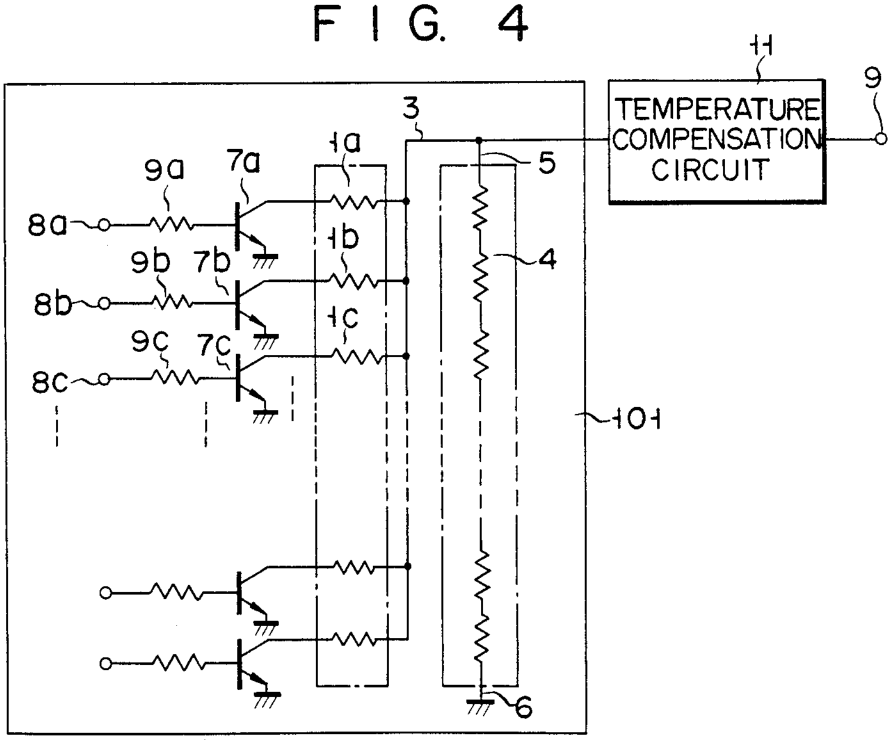
FIG. 4 shows a circuit diagram of the circuit of FIG. 3 having a temperature compensating circuit therein, which is another embodiment of the present invention.

FIG. 4 shows another embodiment of the present invention, corresponding to the FIG. 3 embodiment but provided with a temperature compensating circuit 11. Since this embodiment is the same as the FIG. 3 embodiment except that a temperature compensating circuit 11 is provided, and like reference numerals are applied to like portions in the following detailed explanation.

The temperature compensating circuit 11 controls the calorific value of the auxiliary heating element 4 in relation to changes in the ambient temperature. Specifically, when the ambient temperature drops, the calorific value of the auxiliary heating element 4 is increased. On the other hand, when it rises, the calorific value is decreased. The FIG. 4 embodiment can achieve the beneficial results of the embodiment of FIG. 3 and contains a temperature compensation function for the ambient temperature changes as well.

Figure 5:
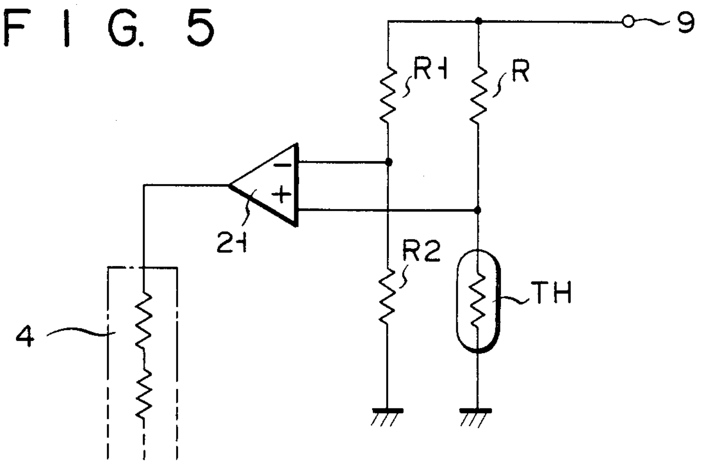
FIG. 5 is a practical arrangement of the temperature compensating circuit incorporated into the circuit of FIG. 3.

FIG. 5 shows temperature compensating circuit 11. A series circuit of a resistor R and a thermistor TH which acts as a negative resistive element for temperature change is provided between the power source terminal 9 and the ground. A junction between the resistor R and the thermistor TH is connected to a "+" terminal of an amplifier 21 with an amplification factor K. A series circuit of resistors R1 and R2 is provided between the power source terminal 9 and the ground. A junction between the resistors R1 and R2 is connected to a "−" terminal of the amplifier 21. The output terminal of the amplifier 21 is connected to the auxiliary heating element 4. Since the junction between the resistors R1 and R2 is connected to the "−" terminal of the amplifier 21, a fixed bias voltage is applied to the amplifier 21. A voltage corresponding to a change of the embodiment temperature is applied to the "+" terminal. When the ambient temperaure rises, resistance of the thermistor TH increases and the voltage applied to the "+" terminal increases. Therefore, the output of the amplifier 21 is increased by an amount equal to the product of the increased amount of the voltage and the amplification factor K. As a result, the current flowing through the auxiliary heating element 4 increases and the calorific value of the auxiliary heating element 4 also increases. Conversely, when the ambient temperature rises, the resistance of the thermistor TH decreases and the voltage applied to the "+" terminal is small. Therefore, the output of the amplifier 21 decreases by an amount equal to the product of the decreased amount of the voltage and the amplification factor K. The result is that the current flowing through the auxiliary heating element 4 decreases and the calorific value of the auxiliary heating element 4 also decreases.

Figure 6:
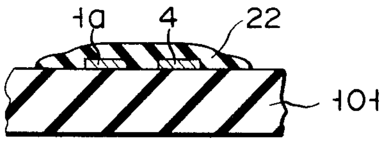
FIG. 6 shows a cross sectional view of the heating section of FIG. 2, 3 or 4.

FIG. 6 shows a cross sectional view of a heating section of the thermal printing head shown in FIG. 2, 3 or 4.

As shown, the main heating element la and the auxiliary heating element 4 located close to the former are provided on one of the surfaces of the radiating substrate 101 made of silicon, for example. The main and auxiliary heating elements la and 4 are covered with and protected by a protective insulation film with a high thermal conductivity. The protective film 22 is not illustrated in FIGS. 2, 3 and 4, for simplicity.

Figure 7:
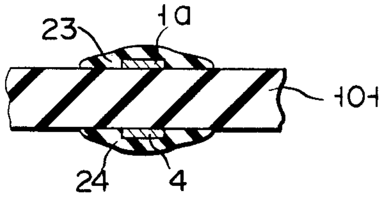
FIGS. 7 and 8 show cross sectional views of other examples of the heating section.
Figure 8:
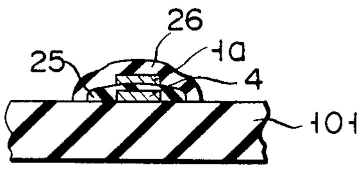

The arrangement of the heating section is not limited by the above-embodiment, and may be represented by the embodiment shown in FIG. 7 or 8. In this embodiment, the main heating elements 1*a*, 1*b*, 1*c*, . . . are provided on one of the surfaces of the radiating substrate 101 and the auxiliary heating element 4 on the other surface. Also, the main heating elements 1*a*, 1*b*, 1*c*, . . . and the auxiliary heating element 4 are covered with and protected by protective films 23 and 24. As shown in FIG. 8, the auxiliary heating element 4 is formed on one of the surfaces of the radiating substrate 101 and the main heating elements 1*a*, 1*b*, 1*c*, . . . are formed on top of the auxiliary heating element 4 with an insulating film 25, made of material with a high thermal conductivity, positioned. Also, the main heating elements 1*a*, 1*b*, 1*c*, . . . are covered with and protected by a protective film 26.

As described above, according to the present invention, there is provided a thermal printing system in which, when the auxiliary heating element is heated to a temperature below the print feasible temperature, the main heating elements are heated at the same temperature, and at the time of dot printing, the main heating elements are energized to the print feasible temperature. This printing system is easy to operate and can provide a highly accurate pattern even when printed at high speed. The present invention further provides a thermal printing head apparatus in which an auxiliary heating element heated at a temperature below the print feasible temperaure during operation is provided near the main heating elements. This apparatus is simple in construction and provides a highly accurate pattern.

This invention is not limited to the above mentioned embodiments, but may be modified within the scope of the present invention. It should be understood that this invention involves a thermal head apparatus provided with the auxiliary heating element and a thermal printing system in which an auxiliary heating element is previously heated at a temperature below the print feasible temperature and at the time of printing, the main heating elements are heated to a print feasible temperature.

What is claimed is:

1. A thermal printing head apparatus comprising:

a radiating substrate;

a plurality of main heating elements arranged in a line, provided on a surface of said radiating substrate;

an auxiliary heating element mounted on a surface of said radiating substrate near said main housing means; and controllable driving means for driving said auxiliary heating means to heat said main heating elements to a temperature below a dot print feasible temperature, and for independently driving selected ones of said main heating elements to said dot feasible temperature so as to print a given pattern.

2. A thermal printing head apparatus according to claim 1, in which said auxiliary heating element is energized by a power source.

3. A thermal printing head apparatus according to claim 1, in which said driving means drives selected ones of said main heating elements in response to a control signal corresponding to the pattern being printed.

4. A thermal printing head apparatus according to claim 1, in which said main heating elements selected are heated by a power source.

5. A thermal printing apparatus according to claim 1, wherein said controllable driving means includes a temperature compensating circuit which makes the heating temperature of said auxiliary heating element drop when ambient temperature rises and makes said heating temperature rise when the ambient temperature drops.

6. A thermal printing head apparatus according to claim 5, in which said temperature compensating circuit comprises a series circuit with a resistive element and an element exhibiting a negative resistive characteristic for temperature change, the series circuit being connected in series between a power source potential and a reference potential, fixed bias means, and amplifier means with one of the input terminals impressed with a fixed bias from said fixed bias means and said other input terminal applied with a potential at a junction between said resistive element and the negative resistive element in said series circuit, said amplifier means amplifying said junction potential and applying the amplified one to said auxiliary heating means.

7. A thermal printing head apparatus according to claim 1, in which said main heating elements and said auxiliary heating elements are provided on the same surface of said radiating substrate.

8. A thermal printing head apparatus according to claim 1, in which said main heating means and said auxiliary heating element are layered on the surface of said radiating substrate.

9. A thermal printing head apparatus according to claim 1, in which said main heating elements are provided on one of the surfaces of said radiating substrate and said auxiliary heating element is provided on the other surface.

* * * * *